Jan. 7, 1930.  B. F. MULDOON  1,742,212
CHRISTMAS TREE HOLDER

Filed May 6, 1927

Bernard F. Muldoon Inventor

By his Attorneys

Gifford & Scull

Patented Jan. 7, 1930

1,742,212

UNITED STATES PATENT OFFICE

BERNARD F. MULDOON, OF MOUNTAIN VIEW, NEW JERSEY, ASSIGNOR TO HENRY HYMAN, OF BROOKLYN, NEW YORK

CHRISTMAS-TREE HOLDER

Application filed May 6, 1927. Serial No. 189,196.

This invention relates to a device for holding a Christmas tree in upright position, which comprises a base or holder having a recess or opening into which the lower end of the tree can be inserted and fastened. The base is provided with lamp sockets into which lamps may be inserted for illuminating the base itself, and may also be provided with one or more plug sockets into which the plug of a lamp cord may be inserted.

Christmas tree holders or bases of this character that have heretofore been made have been unsightly and out of harmony with the tree and its decorations. By the present invention a base or holder is provided that is attractive in appearance; can be made harmonious with the tree and its decorations; is inexpensive to produce and at the same time performs the function of securely holding the tree in place.

In carrying out the invention, the outside of the base or holder itself can be illuminated by lamp bulbs disposed on or around the base itself, and the outside surface of the base is provided with particles of light reflecting material, such as flakes of mica, for example, by which a glittering or scintillating effect that is pleasing to the eye may be obtained. The beautiful apperance of the tree and its base as a whole is thereby enhanced because the particles of light reflecting surfaces on the base simulate somewhat the appearance of the light reflecting tinsel on the tree itself, and the two produce the same sort of effect upon the eye of the beholder, thus securing a very harmonious and attractive effect.

Figure 1:
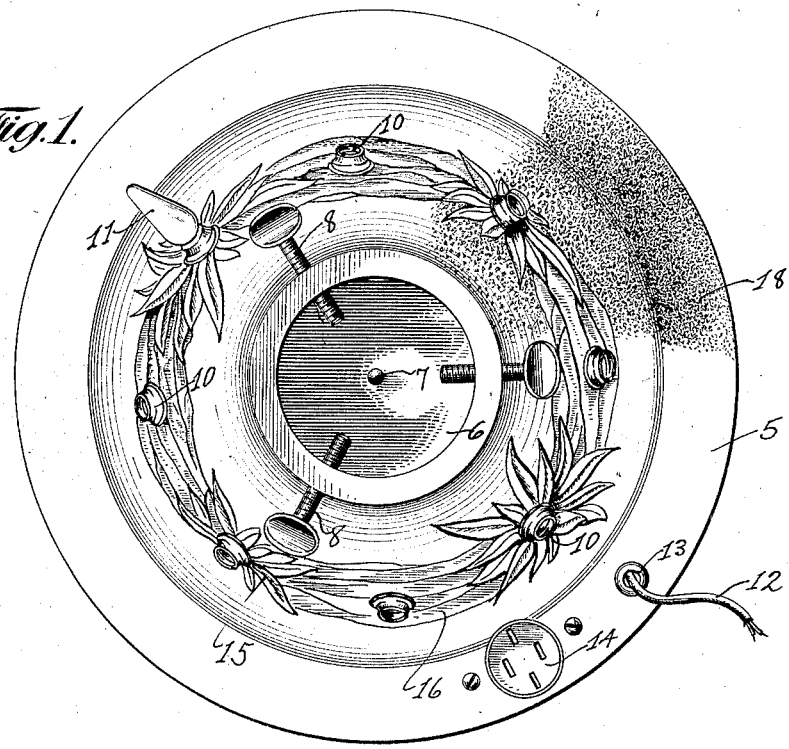
Figure 2:
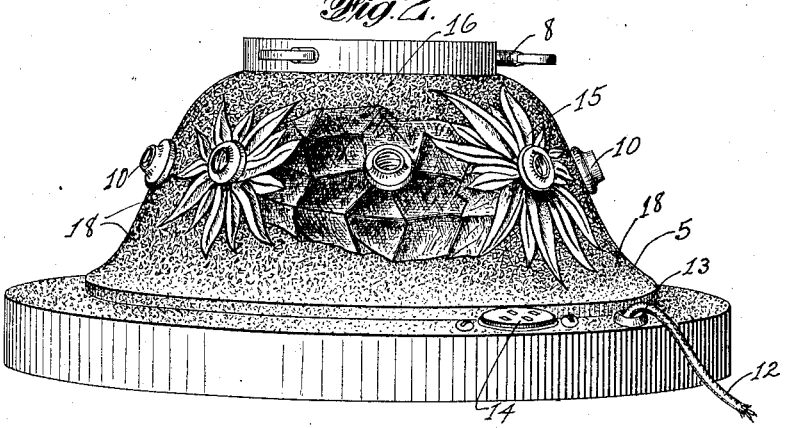

The invention will be understood from the description in connection with the accompanying drawings, in which Fig. 1 is a plan view of the base and Fig. 2 is a side view of the same. In the drawings, reference character 5 indicates the base that is preferably made circular in cross section, and of larger diameter at the bottom than at the top with portions of the outside surfaces of the base inclined in such a manner that the tendency will be for the light that strikes the same to be diffused or outwardly reflected in an inclined direction. The base is provided with a recess 6 to receive the lower end of the tree, and a conical pin 7 is located in the bottom of the recess to prevent the lower end of the tree from slipping sidewise and thumb screws 8 are provided for securely holding trees of different sizes in place. The recess 6 also serves as a container for water to aid in keeping the tree from drying out too rapidly.

A row of electric lamp sockets 10 that are preferably horizontally disposed around the base are located so that electric lamp bulbs 11 can be screwed into the same from the outside. The sockets 10 are connected in series in the usual well known manner, and receive current from an electric light cord 12 that may extend through the hole 13 and be connected to the sockets in series. A plug socket 14, into which a plug for a string of lights may be inserted, is located on the base 5 at some conveniently accessible point and may be connected in parallel with the sockets 10 and connected to the cord 12. A horizontal row of ornamentation may be provided in proximity to the sockets 10 as indicated. This ornamentation may consist, for example, of painted red portions 15 in the shape of poinsettas, at the centers of which the alternate sockets 10 are placed with intermediate painted green portions 16 in the shape of holly leaves next to or surrounding the other sockets 10. The lights 11 may be red and green to correspond to the painted portions. The base 5 is provided on its outside surface with numerous small particles of light reflecting material 18. This may be done, for example, by painting the outside of the base and while the paint is still wet, sprinkling flake mica upon the paint, which becomes slightly imbedded and is securely held in place when the paint dries.

I claim:

1. A Christmas tree holder having a base with an outwardly and downwardly directed outer surface, particles of light reflecting material partially imbedded in said surface, a row of electric light sockets around said base mounted on said surface, and means for retaining a Christmas tree in upright position in said base.

2. A Christmas tree holder having a base with an outwardly and downwardly directed outer surface, a row of electric light sockets around said base mounted on said surface, ornamental devices on said surface of different colors in proximity to said sockets, and means for retaining a Christmas tree in upright position in said base.

3. A Christmas tree holder having a circular base with an upper convex outer surface and a lower horizontal surface, particles of light reflecting material partially imbedded in said surfaces, a circular row of electric light sockets around said base to hold electric lights for illuminating said surface, ornamental devices of different colors in proximity to said sockets, and means for retaining a Christmas tree in upright position in said base.

BERNARD F. MULDOON.